United States Patent [19]

Campbell

[11] 4,008,025
[45] Feb. 15, 1977

[54] BREAD DOUGH ROUNDER BAR
[75] Inventor: Sterrett P. Campbell, Atlanta, Ga.
[73] Assignee: Pak-It Mgf Co., Inc., Atlanta, Ga.
[22] Filed: Nov. 15, 1974
[21] Appl. No.: 524,085
[52] U.S. Cl. .................. 425/96; 425/332; 425/364 R; 425/402; 425/403; 425/470
[51] Int. Cl.[2] ........................ A21C 11/00
[58] Field of Search ........... 425/332, 324, 364 B, 425/96, 333, 340, 364, 402–403, 470, 92, 19, 90

[56] References Cited
UNITED STATES PATENTS

| | | | |
|---|---|---|---|
| 793,155 | 6/1905 | Piper | 425/332 |
| 942,154 | 12/1909 | Van Houten, Jr. | 425/332 |
| 1,122,888 | 12/1914 | Engel | 425/200 |
| 1,674,229 | 6/1928 | Scruggs | 425/364 X |
| 1,726,969 | 9/1929 | Wescott | 425/332 X |
| 1,730,394 | 10/1929 | Tessin | 425/96 |
| 1,796,922 | 3/1931 | Eseman | 425/470 |
| 2,136,487 | 11/1938 | Brykczynski | 425/332 |
| 2,677,334 | 5/1954 | Hansen | 425/364 |
| 2,759,435 | 8/1956 | Krawczak | 425/364 |
| 2,858,775 | 11/1958 | Marasso | 425/241 |
| 3,377,965 | 4/1968 | Atwood | 425/364 |
| 3,507,227 | 4/1970 | Pickles | 425/96 X |
| 3,521,578 | 7/1970 | Fraioli, Sr. | 425/332 |

FOREIGN PATENTS OR APPLICATIONS

| | | | |
|---|---|---|---|
| 298,810 | 7/1932 | Italy | 425/364 |
| 97,836 | 4/1961 | Norway | 425/332 |

Primary Examiner—Francis S. Husar
Assistant Examiner—John McQuade
Attorney, Agent, or Firm—Jones, Thomas & Askew

[57] ABSTRACT

A bread dough rounder bar for use with conventional dough dividing equipment to convert a dough piece into a rounded dough ball which may be subsequently processed into a bread bun or roll or the like. The rounder bar includes a work surface which varies in cross-section between an entrance section, a compression section and a rounding section.

2 Claims, 9 Drawing Figures

BREAD DOUGH ROUNDER BAR

This invention relates to a bread dough rounder bar for use with conventional dough dividing equipment. More particularly, the present invention converts volumetrically scaled portions of bread dough into rounded dough pieces for subsequent processing into bread buns or rolls and the like.

Conventionally, bread dough is divided and rolled into dough balls in wholesale bakery plants using equipment such as shown in U.S. Pat. No. 2,858,775 (such equipment being known in the industry as the "K head" equipment). When using the K head equipment, it is necessary immediately after dividing the dough into volumetrically scaled portions, to round the dough into ball-like shapes and develop an outer skin. This is accomplished by dropping the correctly sized dough pieces onto a moving conveyor belt which has four spaced rounder bars positioned above the belt. These bars have a constant cross-section concave side facing the belt with one side of each bar riding on or just above the belt and with the bars arranged angularly with respect to the running direction of the belt. The concave side of the bars are provided with an attached strip of Teflon material or a sprayed on coating of Teflon material which resists the tendency of the dough to stick to the bar as the dough piece proceeds between the belt and the bar. Because of the movement of the belt, the dough is forced to roll between the belt and the concave stationary side of the bar. Because of this rolling action the dough piece rounds into a ball and develops an outer skin. The foot of the bar, that portion in contact with the belt, scrapes the dough piece off the belt thereby preventing the dough from sticking to the belt and leaking under the bar.

The rounder bars in current use have several disadvantages as follows:

1. A significant tendency for pieces of dough to adhere to the concave surface of the bar and lift off the belt thereby stopping until the next dough piece comes along and contacts the stopped dough piece to produce a double and lost product. This malfunction occurs more often when running small dough pieces, when running aged dough, and when running dough with an increased percentage of water. Because of this tendency, current bars with a sprayed on Teflon material coating must be recoated at frequent intervals. Bars with attached strips of Teflon material have longer life, however, known glues do not adequately hold the Teflon material in place over a long period thus requiring frequent maintenance or bar replacement.

2. A tendency for dough pieces to proceed at an irregular rate along the bars thereby causing dough pieces to exit from the bars "out of time" with malplacement of rounded dough pieces into the next processing machine.

3. As discussed previously, bars come in contact with the belt at the "foot" of the bar. While the concave area of conventional bars is typically spray coated or strip laminated with Teflon material, the foot is not. Hence a certain amount of heat is generated by the friction of the belt passing under the foot. This heat is transferred by the superior thermal conductivity of the conventional cast iron bar to the concave surface of the bar which is in contact with the dough piece. This temperature increase greatly increases the tendency of the dough piece to stick to the bar thereby increasing the frequency of doubling and misfeeding and also causing, in some instances, a degradation of product quality.

4. Because of their fixed contour and cross-section, conventional bars do a progressively poorer job of rounding as the dough ball size increases from the ideal size for which the bar was designed. The bar does a progressively poorer job of keeping the dough pieces rolling uniformly "in time" and preventing doubling as the dough piece size decreases from the theoretical ideal size. In addition bakeries have found it difficult to keep large pieces from rolling out in an oblong shape which results in an oblong hamburger bun and expensive marketing problems.

5. Conventional iron casting rounder bars are very rigid and have a tendency to leak dough between the belt and the foot of the bar at any point where either the foot of the bar or the bed under the bar and belt is not absolutely flat. Because of the difficulty of maintaining an absolutely flat foot and bed, leakage is a serious problem.

6. The sharp cutting edge maintained on the foot of the conventional cast iron bar has a tendency to scalp and otherwise wear the belt running thereunder, thus seriously reducing belt life.

It is an object of the present invention therefore to round the dough pieces as they issue from conventional dividing equipment while maintaining the sequence of the dough pieces and proper spacing for the dough pieces so that regimented and regular files of rounded dough pieces are produced for subsequent processing.

These and other advantages of the present invention may be more clearly understood from reference to the following description of one embodiment of the present invention and the accompanying drawings wherein.

Figure 1:
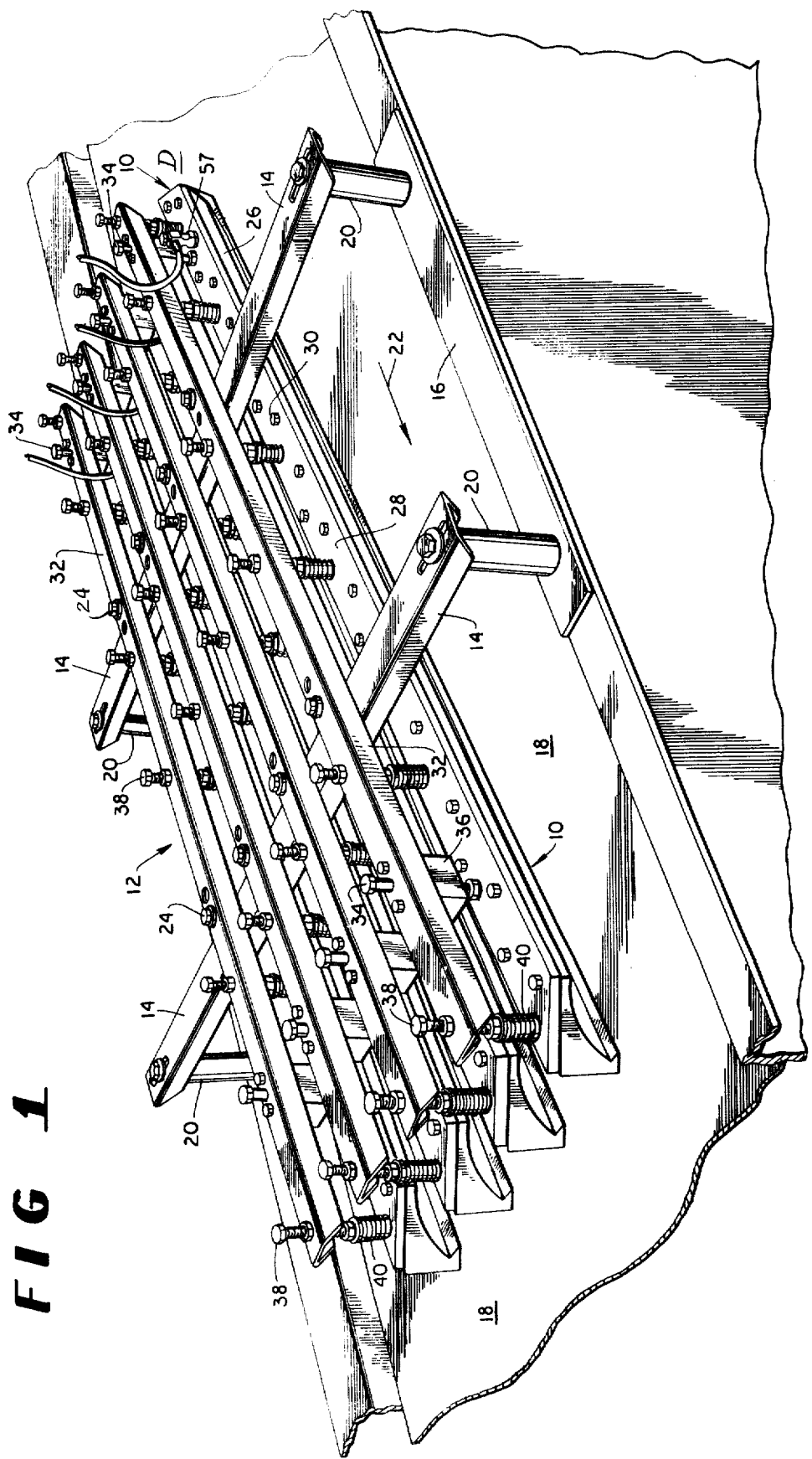
FIG. 1 is a perspective view of four bread dough rounder bars of the present invention properly mounted over a conveyor belt.

With reference to the drawings and according to the present invention, a bread dough rounder bar 10 is shown in FIG. 1 assembled together with three other rounder bars in a commercial embodiment 12 of the present invention. Standard bread dough dividing equipment produces a row of four bread dough pieces at regular intervals. Consequently, the commercial embodiment of FIG. 1 is constructed and arranged to simultaneously round those four dough pieces by passage of the pieces through four parallel rounder bars. Embodiment 12 consists of two cross pieces 14 for mounting the rounder bars 10 to the bed 16 of conveyor belt 18. Cross pieces 14 are slotted at the points of connection to posts 20 so that the assembly of rounder bars may be adjusted transversely with respect to the movement of the conveyor belt 18 for proper alignment of the bars with the dough pieces as they are deposited onto the belt 18. The rounder bars 10 are fixed to cross-pieces 14 by bolts 24. In operation a row of four dough pieces is deposited onto the belt 18 at the area of the belt generally designated as D. Belt 18 moves in the direction designated by arrow 22 and carries the dough pieces under the rounder bars 10. Further explanation of the operation of the rounder bars will be provided in a later portion of this specification.

The four rounder bars 10 shown in FIG. 1 are identical in construction and consequently only one will be discussed in this specification. It should be clearly understood, however, that the specific number of rounder bars shown in FIG. 1 does not form a part of this invention. The number of rounder bars is determined by the number of dough pieces deposited on the conveyor belt at one time by the dough dividing equipment. More or less rounder bars may be used based on the capabilities of the dough dividing equipment.

The rounder bar 10 consists of a unitary length of plastic material 26 having an entrance end 25 and an exit end 27. Plastic material 26 is joined on its upper surface to a flat metallic member 28. While it is not necessary for the bar to include the metallic member, the presence of the member provides easier mounting of the bar to the supporting crosspieces and increases the ease of machining or shaping the plastic material, and the member also provides some stiffness without severely limiting the flexibility of the plastic material. Consequently, the plastic material is able to assume the contours of the conveyor belt and its bed surface. As shown in this embodiment the flat member 28 is fastened to the plastic material with screws 30. Of course, other conventional mounting means could be employed if desired. In the preferred embodiment of this invention material 26 is ultra high molecular weight polyethylene. It should be understood that other plastic materials could also be used for material 26. In addition materials other than plastics, such as metals and the like, could be used. Ultra high molecular weight polyethylene is desired because of its exceptional release (high slip) properties and its extraordinary abrasive wear resistance.

Flat member 28 and its plastic material 26 are movably fixed to a support member 32 through two types of cooperating connections. The first connection is a pair of studs 34 mounted generally at opposite ends of the rounder bar. Studs 34 are threaded into flat member 28 and fixed thereto. The studs pass through bearing blocks 36 mounted on the support member 32 and are slidably retained thereby. This arrangement permits vertical movement of the flat member and its plastic material with respect to the support member 32, but restricts twisting movement and otherwise holds the plastic material steady in all other respects. The second connection is a series of spring loaded studs 38 that are threaded through support member 32 for variation in length with respect to member 32. The ends of studs 38 engage a series of compression springs 40 which in turn engage flat member 28. By varying the length of studs 38 it is possible to vary the pressure at any given point along the length of flat member 28 and its plastic material to adjust the bar for variations in the contour of the conveyor and eliminate any gaps between the bar and the conveyor belt. The presence of compression springs 40 permits the bar to ride over bumps in the conveyor belt by compressing the spring while maintaining a constant pressure otherwise. The variable pressure possibilities of this second means of connection in combination with the flexibility of the plastic material substantially reduces or eliminates leakage of bread dough between the bar and the conveyor belt and substantially reduces wear on the belt.

Support member 32 is connected by bolts 24 to crosspieces 14 which are in turn joined to the bed of the conveyor belt as previously described.

Figure 2:
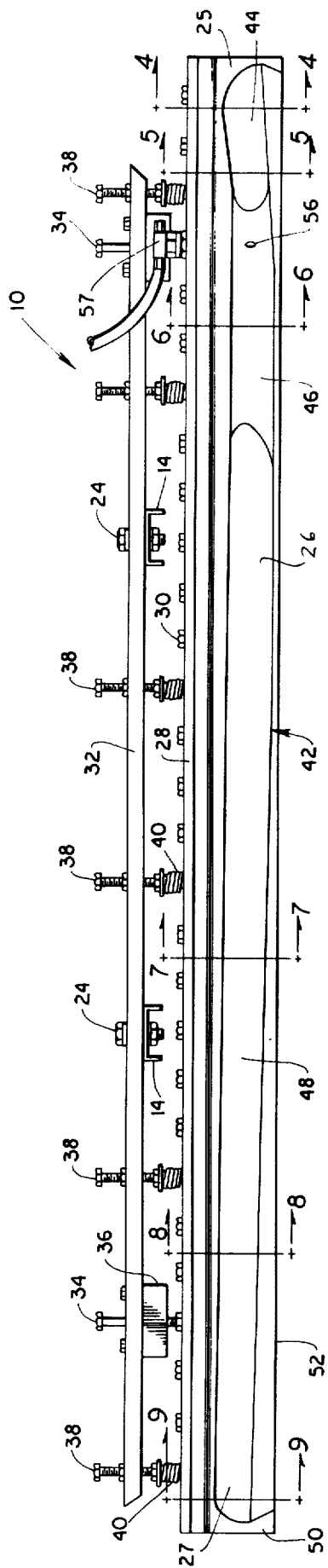
FIG. 2 is a side elevation of a single bread dough rounder bar showing the work surface of the bar.
Figure 4:
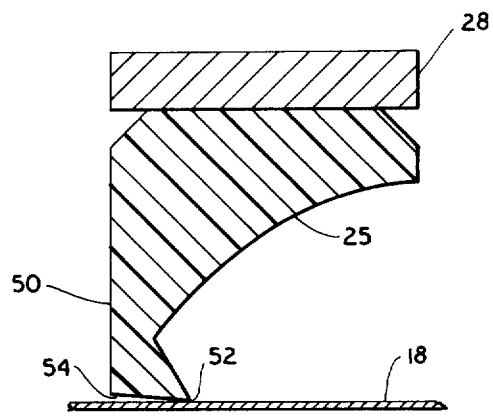
FIGS. 4–9 are cross-sectional views of the bar taken along the appropriate lines shown in FIG. 2.
Figure 5:
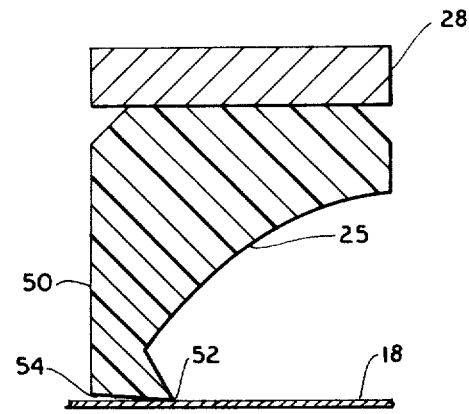
Figure 6:
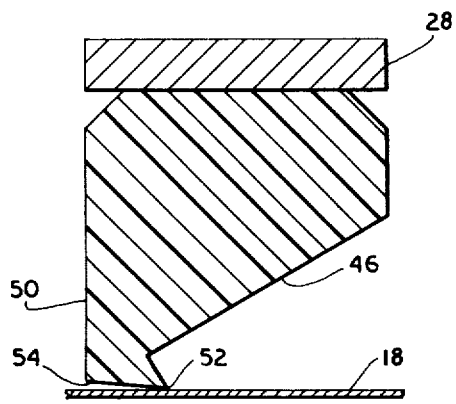

A particularly critical aspect of the present invention resides in the design of the plastic material 26. This material defines a cavity having a work surface of varying cross section to contact and roll bread dough pieces. As shown best in FIGS. 1, 2 and 3 and particularly FIG. 3, the work surface 42 varies along its length in the height and volume of its cavity formed with the conveyor belt 18. Bread dough pieces enter and engage the work surface from the right hand side of FIGS. 2 and 3 at the entrance end 25. This entrance end of the work surface is referred to as the entrance section 44 and generally is a high rounded cavity angling downwardly toward the conveyor belt. Thie relatively open area (FIG. 4) is of sufficient concavity to accept conventional dough pieces from large to small size. The entrance section rapidly decreases in concavity (FIG. 5) and height from the conveyor belt to slightly squeeze the dough piece. The dough piece then enters the second section of the work surface, referred to herein as the compression section 46 (FIG. 6). In this section of the work surface, the dough piece is compressed by a relatively flat-roofed cavity having an angle of approximately 30° with the belt when measured in the transverse direction, and the dough is forced to roll and form a skin. The compression section may have a straight roof but preferably slopes downwardly in the direction of travel of the dough piece. This constantly decreasing cavity causes the belt to draw the dough piece along and prevents the dough piece from lifting off of the belt and sticking to the work surface. Normally, if the dough piece will roll two revolutions, a skin is formed and further problems with sticking or doubling are substantially reduced.

Figure 7:
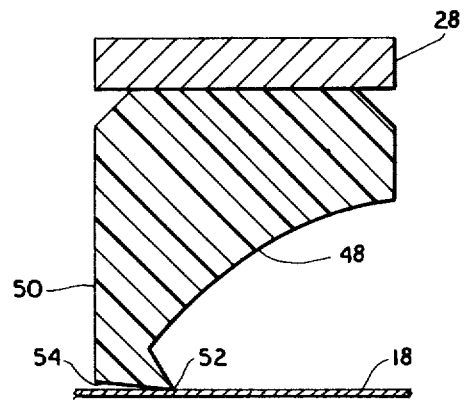
Figure 8:
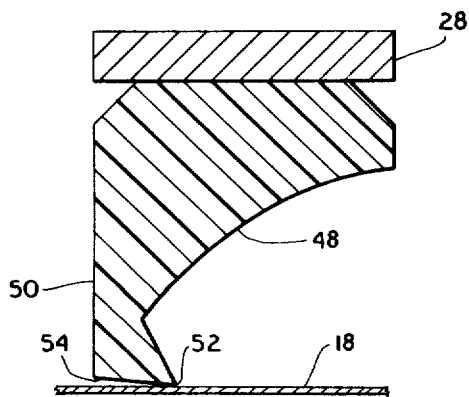
Figure 9:
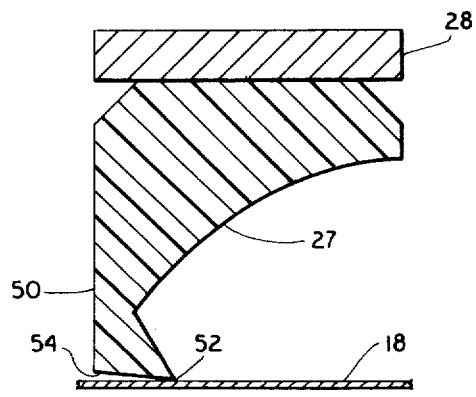

Following the compression section the dough piece enters the rounding section 48. The cavity of this section gradually increases in concavity and height from the conveyor belt as the dough piece moves through the section (FIGS. 7, 8 and 9). This increase in concavity and height causes the dough piece to roll several revolutions and form a substantially spherical ball. By increasing gradually in height from the belt, the cavity of the rounding section becomes larger and larger thereby properly rounding larger dough pieces without causing sticking or doubling of the dough. At the completion of the rounding section, the rounded dough piece is not in contact with the work surface and therefore releases from the work surface and the belt and moves into other processing equipment by virtue of the movement of the conveyor belt. As a result, dough pieces are rounded at a regular pace so that adequate and regular spacing is maintained between adjacent rows of dough pieces. In addition, malfunction problems such as dough doubling are substantially reduced.

It should be understood that in an alternative embodiment, it is possible to eliminate the compression section 46 and simply extend the rounding section 48 to a point of juncture with the entrance section 44. For this embodiment, there are advantages of reduction of changes in design for the work surface but disadvantages involved in the mechanics of machining a long section such as a long rounding section 48 and properly integrating that section into entrance section 44. In addition more consistent results are achieved with the preferred three section work surface.

Figure 3:
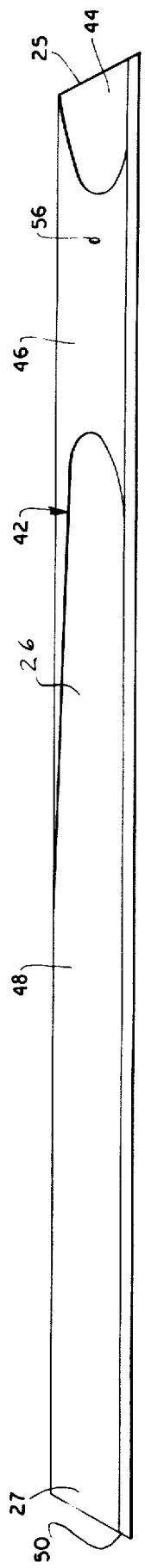
FIG. 3 is a bottom view of the bar.

As shown in FIG. 3, compression section 46 may optionally include an outlet 56 for releasing an edible vegetable oil along the work surface. The vegetable oil serves to lubricate the work surface and other suitable lubricants could be substituted for the edible vegetable oil so long as they were compatible with the baking industry. The use of a lubricant to lubricate the work surface is an interesting aspect of the present invention which under many circumstances produces very satisfactory results when difficult to handle bread dough is encountered. It should be understood that additional points of lubricant release may be provided along the length of the work surface. Lubricant may be brought to outlet 56 in a conventional manner such as by tubing or other such equipment 57.

An additional feature of the present bread dough rounder bar concerns foot section 50, best shown in FIGS. 4–9. Foot section 50 includes a knife edge 52 and a foot surface 54. Foot section 50 is constructed so that knife edge 52 engages conveyor belt 18 and foot surface 54 angles upwardly and away from engagement with conveyor belt 18. With this arrangement it is possible for knife edge 52 to fit very tightly against the conveyor belt and reduce or prevent leakage of dough between the bar and the conveyor belt. Foot section 50 is designed to engage the belt 18 only at its knife edge and thereby create a tight fit between that edge and the belt.

The rounder bars of the present invention are conventionally mounted over a conveyor belt at an angle with respect to the direction of travel of the belt so that dough pieces are carried into contact with the rounder bars by the movement of the conveyor belt and then forced into the cavity of the rounder bars by the continued travel of the belt. The transverse movement of the belt with respect to the rounder bars, causes the disc shaped dough pieces (as conventionally produced by the dough dividing equipment of U.S. Pat. No. 2,858,775) to roll into round dough pieces for subsequent processing into products such as variously sized hamburger buns. One of the more desirable features of the present rounder bars is their ability to receive and roll dough pieces of both large and small size to produce hamburger buns of correspondingly large and small size.

It should be clearly understood that the word "bread" is used herein to mean a food made of flour or meal with liquid, shortening and leavenings which may be kneaded, shaped, allowed to rise and then baked to produce various bread products such as rolls, buns, loaf bread and the like.

While this invention has been described in detail, with particular reference to preferred embodiments thereof, it will be understood that variations and modifications can be effected within the spirit and scope of the invention as described in the appended claims.

I claim:

1. Bread dough rounder bar defining a cavity along its length, said cavity varying in cross-section from an entrance end to an exit end and having a first concave work surface which decreases in height from the entrance end to a point intermediate the ends of the cavity, a flat-roofed work surface beginning at said point and proceeding toward said exit end to join a second concave work surface which increases in height from said flat-roofed surface to the exit end.

2. Bread dough rounder bar of claim 1 including means for releasing a lubricant to spread along at least a portion of the length of the work surface.

* * * * *